(12) United States Patent
Zulak et al.

(10) Patent No.: US 11,640,410 B1
(45) Date of Patent: May 2, 2023

(54) DISTRIBUTED LOG PROCESSING FOR DATA REPLICATION GROUPS

(71) Applicant: Amazon Technologies, Inc., Seattle, WA (US)

(72) Inventors: Matthew Joseph Zulak, Seattle, WA (US); Tao Chen, Sammamish, WA (US); Fan Ping, Kenmore, WA (US); Lakshmi N. Pallikila, Seattle, WA (US); Shobha Agrawal, Seattle, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 14/957,421

(22) Filed: Dec. 2, 2015

(51) Int. Cl.
*G06F 16/27* (2019.01)
(52) U.S. Cl.
CPC .................................. *G06F 16/27* (2019.01)
(58) Field of Classification Search
CPC ......... G06F 17/30598; G06F 17/30581; G06F 17/30867; G06F 17/30575; G06F 11/1451; G06F 17/30578; G06F 11/1461; G06F 11/1469; G06F 17/30215; G06F 17/30194; G06F 17/30368; G06F 21/6218; G06F 16/285; G06F 16/275; G06F 16/1837; G06F 16/3331; G06F 16/27; G06F 16/273; G06F 16/25; G06F 16/278; G06F 16/68; G06F 16/1844; G06F 16/2358; G06F 16/2365; G06F 16/1805; G06F 16/182; G06F 16/1834; G06F 16/21; G06F 16/219; G06F 3/065; G06F 3/0641; G06F 16/1748; G06F 16/174; G06F 11/0778; G06F 16/20

USPC .... 707/770, 999.01, E17.032, E17.107, 654, 707/723, 737, 797, E17.014, E17.108, 707/E17.044, E17.01, 769, 609, 661, 827, 707/639, 999.006, 626, 645, 648; 709/202
See application file for complete search history.

(56) References Cited

U.S. PATENT DOCUMENTS

| | | | |
|---|---|---|---|
| 5,909,540 A | 6/1999 | Carter et al. | |
| 6,374,241 B1 * | 4/2002 | Lamburt | ................. G06F 16/25 707/999.005 |
| 6,662,219 B1 | 12/2003 | Nishanov et al. | |

(Continued)

OTHER PUBLICATIONS

Abadi, "Consistency Tradeoffs in Modern Distributed Database System Design," Computer 45(2):37-42, Feb. 2012.

(Continued)

*Primary Examiner* — Allen S Lin
*Assistant Examiner* — Cecile H Vo
(74) *Attorney, Agent, or Firm* — Davis Wright Tremaine LLP

(57) ABSTRACT

Data replication groups may be used to store data in a distributed computing environment. The data replication groups may include a set of nodes executing a consensus protocol to maintain data durably. The nodes of the data replication groups may generate logs containing information corresponding committed operations performed by the nodes. These logs may be collected and processed to obtain useful information corresponding to the operation of the data replication group. Furthermore, this processed information may be provided in the form of a stream to enable event driven operations corresponding to the logs.

21 Claims, 9 Drawing Sheets

(56) References Cited

U.S. PATENT DOCUMENTS

| | | | |
|---|---|---|---|
| 7,039,773 | B2 | 5/2006 | Hu et al. |
| 7,461,130 | B1 | 12/2008 | AbdelAziz et al. |
| 7,711,820 | B2 | 5/2010 | Sharma et al. |
| 7,937,482 | B1 | 5/2011 | Vermeulen et al. |
| 8,135,775 | B1 | 3/2012 | Anderson et al. |
| 8,301,600 | B1 | 10/2012 | Helmick et al. |
| 8,572,031 | B2 | 10/2013 | Merriman et al. |
| 8,732,517 | B1 | 5/2014 | Stefani et al. |
| 8,818,954 | B1 * | 8/2014 | Bergant .............. G06F 11/2074 707/645 |
| 8,843,441 | B1 | 9/2014 | Rath et al. |
| 8,856,593 | B2 | 10/2014 | Eckhardt et al. |
| 8,868,514 | B2 | 10/2014 | Lomet et al. |
| 8,965,849 | B1 | 2/2015 | Goo |
| 9,047,246 | B1 | 6/2015 | Rahut |
| 9,047,331 | B2 | 6/2015 | Rao et al. |
| 9,223,843 | B1 | 12/2015 | Madhavarapu et al. |
| 9,230,000 | B1 | 1/2016 | Hsieh et al. |
| 9,317,576 | B2 | 4/2016 | Merriman et al. |
| 9,489,434 | B1 | 11/2016 | Rath |
| 9,552,242 | B1 | 1/2017 | Leshinsky et al. |
| 9,569,513 | B1 | 2/2017 | Vig et al. |
| 9,639,589 | B1 * | 5/2017 | Theimer ................ G06F 21/00 |
| 9,805,108 | B2 | 10/2017 | Merriman et al. |
| 10,171,629 | B2 | 1/2019 | Bute et al. |
| 10,489,230 | B1 * | 11/2019 | Chen ................. G06F 11/0787 |
| 2002/0161889 | A1 | 10/2002 | Gamache et al. |
| 2004/0263152 | A1 | 12/2004 | Ahrikencheikh |
| 2005/0005200 | A1 | 1/2005 | Matena et al. |
| 2006/0020634 | A1 | 1/2006 | Huras et al. |
| 2006/0155912 | A1 * | 7/2006 | Singh .................... G06F 9/5088 711/6 |
| 2006/0187906 | A1 | 8/2006 | Bedi et al. |
| 2006/0218204 | A1 | 9/2006 | Ofer et al. |
| 2007/0156842 | A1 | 7/2007 | Vermeulen et al. |
| 2007/0299955 | A1 | 12/2007 | Hoffman et al. |
| 2009/0049240 | A1 | 2/2009 | Oe et al. |
| 2010/0274768 | A1 * | 10/2010 | Wang ...................... G06F 16/27 711/135 |
| 2011/0251997 | A1 * | 10/2011 | Wang ................... G06F 16/273 707/634 |
| 2011/0307886 | A1 | 12/2011 | Thanga et al. |
| 2012/0011398 | A1 | 1/2012 | Eckhardt et al. |
| 2012/0117229 | A1 | 5/2012 | Van Biljon et al. |
| 2012/0197868 | A1 | 8/2012 | Fauser et al. |
| 2013/0110774 | A1 | 5/2013 | Shah et al. |
| 2013/0290249 | A1 | 10/2013 | Merriman et al. |
| 2014/0032506 | A1 | 1/2014 | Hoey et al. |
| 2014/0136896 | A1 | 5/2014 | Tak et al. |
| 2014/0172944 | A1 * | 6/2014 | Newton .................. H04L 67/55 709/202 |
| 2014/0337393 | A1 | 11/2014 | Burchall et al. |
| 2015/0169417 | A1 | 6/2015 | Brandwine et al. |
| 2015/0186229 | A1 | 7/2015 | Bortnikov et al. |
| 2015/0347548 | A1 * | 12/2015 | Mortensen .......... G06F 16/2365 707/618 |
| 2015/0372389 | A1 | 12/2015 | Chen et al. |
| 2016/0147859 | A1 | 5/2016 | Lee et al. |
| 2017/0004317 | A1 | 1/2017 | Bumbulis |
| 2017/0270176 | A1 | 9/2017 | Horowitz et al. |
| 2017/0366451 | A1 | 12/2017 | Schreter |
| 2017/0366619 | A1 | 12/2017 | Schreter |
| 2017/0371567 | A1 | 12/2017 | Piduri |

OTHER PUBLICATIONS

Bernstein, "Rethinking Eventual Consistency," Proceedings of the 2013 ACM SIGMOD International Conference on Management of Data, Jun. 22-27, 2013, 5 pages.

Chandy et al., "Distributed Snapshots: Determining Global States of Distributed Systems," ACM Transactions on Computer Systems 3(1):63-75, Feb. 1985.

Decandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2);51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 bages.

Lamport, "Paxos Made Simple," Microsoft Research, http://research.microsoft.com/en-us/um/people/lamport/pubs/paxos-simple.pdf [retrieved Aug. 22, 2016], 2001, 14 pages.

Letia et al., "CRDTs: Consistency without concurrency control," Rapport de recherche 6956, Jun. 2009, 13 pages.

MacCormick et al., "Niobe: A Practical Replication Protocol," Microsoft Research, https://www.microsoft.com/en-us/research/wp-content/uploads/2007/08/tr-2007-112.pdf [retrieved Aug. 22, 2016], 2007, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, http://arxiv.org/pdf/1209.4187.pdf [retrieved Aug. 22, 2016], 2012, 9 pages.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science)&oldid=783901344, 19 pages.

Chen et al., "Replication Group Pools for Fast Provisioning," U.S. Appl. No. 14/954,928, filed Nov. 30, 2015.

Dhoolam et al., "Node Placement for Replication Groups," U.S. Appl. No. 15/264,479, filed Sep. 13, 2016.

Wikipedia, "Ford-Fulkerson Algorithm," Wikipedia, The Free Encyclopedia, Aug. 9, 2016, https://en.wikipedia.org/wiki/Ford%E2%80%93Fulkerson_algorithm [Retrieved Aug. 29, 2016], 5 pages.

Wikipedia, "Maximum flow problem," Wikipedia, The Free Encyclopedia, Aug. 22, 2016, https://en.wikipedia.org/wiki/Maximum_flow_problem [Retrieved Aug. 29, 2016], 11 pages.

\* cited by examiner

DISTRIBUTED LOG PROCESSING FOR DATA REPLICATION GROUPS

BACKGROUND

Organizations invest in technologies that provide customers with access to computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service (which may be defined using one or more performance metrics) for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is an increase in cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
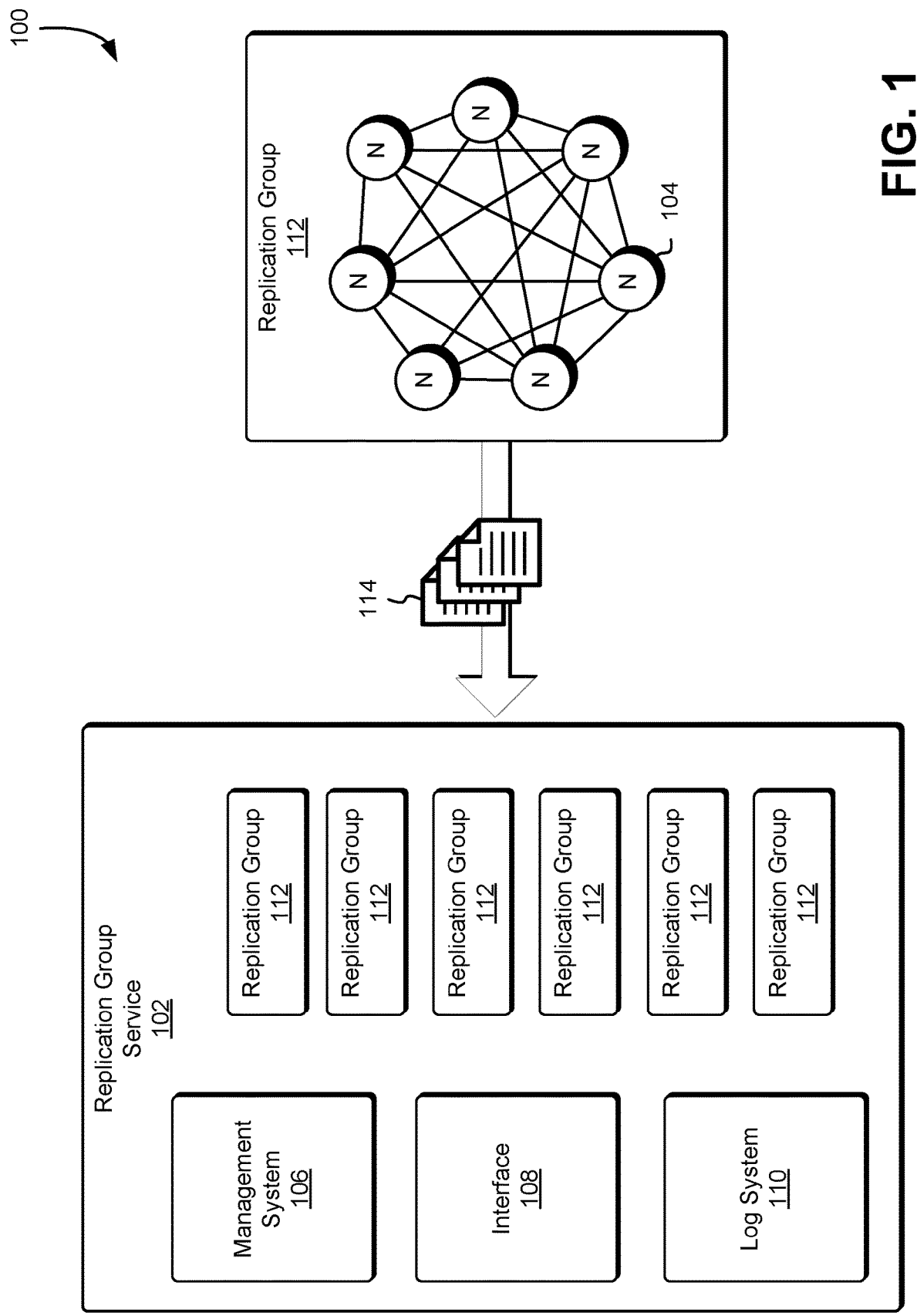
FIG. 1 illustrates aspects of logs associated with a data replication group which may be used to maintain replicas of data and provide consistency between the data replicas in accordance with at least one embodiment.

In various examples described below, logs generated by one or more data replication groups are collected, processed, and provided to various clients. In distributed computing systems, data replication reduces the risk of failure and mitigates possible data loss in the case of system failure. A data replication group may consist of some number of nodes executed by one or more host computer systems, where the nodes implement a consensus protocol, such as Paxos, to enable consistent data replication between the nodes. In general, these data replication groups generated logs of in-flight (e.g., operations currently being processed) and committed operations. Some logs, such as those referred to as operations logs, can contain committed operations. At least a portion of the operations included in the operations logs or other logs are used to perform state-machine transitions of the data replication groups (e.g. updating the value of a record in a key-value store), while other operations are used to perform heart-beats and other checks required to guarantee a data replication group's liveliness and/or validate the data replication group's health.

As described in greater detail below, a data replication group may consist of some number of nodes greater than or equal to one. The nodes may execute the operations and record the committed operations in a log stored locally. These logs may be collected by a log pusher, which may be an application or other executable code maintained on the same computer system executing one or more nodes of the data replication group. At various intervals in time the log pusher may obtain batches of logs from the nodes and provide the logs to a log processor or other computer system such as a remote storage device or data warehouse. The log processor may extract information from the logs and publish the extracted information to a data stream or other end points, such as a client or consumer of the data. Publishing the log information to a stream enables clients to generate event-driven processes based at least in part on log events and/or committed operations included in the logs. For example, a client may generate an event driven process which is configured to delete and/or clean up information associated with a particular key, if the particular key is ever deleted. In another example, an event driven process may be created to perform some operation, such as transmitting a notification, if a value of a record associated with a particular key equals some defined value.

These logs, or more specifically, the operation logs may contain information required to reconstruct the corresponding data replication group including state-machine transitions that occurred during execution of the data replication group. With a copy of a data replication groups operation log, a client can determine the value of a given key at an arbitrary point in time. This enables the client to generate a timeline or other information corresponding to data replication group events based at least in part on the committed operations (e.g., updates to the replicated state-machine) performed by various nodes of the data replication group. Furthermore, by archiving a data replication group's operation log or other log, clients may produce a complete history of the proposals accepted and/or applied by a particular data replication group throughout its life cycle. This history information enables engineers and/or other technicians to investigate the behavior of the data replication groups, particular nodes, consensus protocol implemented between the nodes, network environments, and other aspects of the operation of the data replication group. In addition, archiving a data replication group's operation log and/or other logs also provides a back-up solution for the data replication group because committed operations (e.g., the state-machine transitions of the data replication group) may be used to recreate the data replication group.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider operates a replication group service 102 configured to manage one or more data replication groups 112. Replication group service 102 may be configured as a clustered storage system for storing customer data or other data across a plurality of physical hosts. Such a clustered storage configuration may reduce the risk of failure and increase availability of the data replication groups 112 or particular nodes of the data replication groups 112 during network connection events and/or network connection issues. The data replication service 102 may maintain a plurality of data replication groups 112; in turn, each data replication group 112 may consist of a plurality of nodes 104. The data replication groups 112 may include replicated state machines or other storage systems configured to store data in a distributed computing environment. In various embodiments, each node 104 is a process, executed by a host computer system or other computer system, described in greater detail below, which participates in one or more data replication groups 112. For example, for a particular data replication group 112 implementing the Paxos consensus protocol, each node 104 of the data replication group 112 may implement one or more roles of the Paxos consensus protocol, such as the role of acceptor, proposer, and/or learner. In this manner, the nodes 104 of the data replication group may be responsible for the durability of customer data or other data maintained by the data replication group 112. Furthermore, during implementation of the consensus protocol the nodes 104 may generate logs 114. The log 114 may include information corresponding to the operation of the nodes 104 and/or data replication group 112. The logs 114 may be generated as a result of the operation of the consensus protocol, such as the Paxos consensus protocol.

The Paxos consensus protocol may include a family of different protocols configured to solve consensus issues in a network of unreliable processors (e.g., computer systems and networks that are subject to possible failures). The Paxos consensus protocol ensures agreement on one result and/or one operation among a group of participants, for example, the nodes 104 of the data replication group 112. The Paxos consensus protocol may be used by replication service 102 and the data replication groups 112 to implement state machine replication and/or data replication in a distributed computing environment, such as a computing resource service provider environment 100 illustrated in FIG. 1. The Paxos consensus protocol may define the set of actions which may be performed by the nodes 104 of the data replication groups 112 according to one or more predefined roles included in the Paxos consensus protocol: client, acceptor, proposer, learner, and leader. In some embodiments, a single node 104 of a particular data replication group 112 may implement one or more roles at any given time. For example, a particular node 104 may be a leader, acceptor, and learner in accordance with the Paxos consensus protocol. Furthermore, the actions performed by the node when executing a role may be included in the logs 114. In various embodiments, only committed operations (e.g., accepted proposals) as included in the logs 114 and proposals that are transmitted but never accepted are not included in the logs 114.

A client, which may include a computer system under the control of a customer of the computing resource service provider and/or application or other executable code executed by one or more other computer systems or services of the computing resource service provider, may issue requests to the data replication group 112 and/or replication service 102 and wait for a response. For example, the client may include a customer transmitting a storage request to an interface 108 of the replication service 102. The interface 108 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer. The interface 108 may also provide access to the logs 114 of the data replication groups. Additionally, the replication group service may include a log system 110. The log system 110 may include various components, described in greater detail below, configured to obtain the logs 114 from the nodes 104, process the logs 114, and provide the logs 114 to the client, for example, enabling the client to query the logs 114 for particular events.

In accordance with the Paxos protocol, acceptors implemented by one or more nodes 104 of a data replication group 112 may be collected or assembled into groups, collectively referred to as quorums. In various embodiments of the Paxos protocol, any message sent to an acceptor must be sent to the quorum of acceptor and any message received from an acceptor is ignored unless a copy is received from each acceptor in the quorum. A proposer, when implemented by a node 104 of the data replication group 112, may transmit proposals to acceptors; a proposal may include a message attempting to reach an agreement on a value and/or action by the acceptors. A learner, when implemented by a node 104 of the data replication group 112, may perform some action once an agreement is reached (e.g., transmit a response to the client). In general, any protocol that satisfies the consensus requirements of the replication service 102 and data replication groups 112 may be implemented in accordance with the embodiments described herein. Furthermore, in some embodiments, additional constraints may be placed on the consensus protocol implemented by the replication service 102 and data replication groups 112 as required. For example, the replication service 102 and data replication groups 112 may require the implemented consensus protocol to allow for the addition of a new member and/or node 104 to the data replication group 112 at some point in time after the initialization of the data replication group 112.

Additionally, the number of nodes 104 in the data replication group 112 may vary depending on the latency and durability requirements of the customer, other service of the computer system, or replication service 102. For example, the number of nodes 104 in the data replication 112 may be reduced if a particular service and/or customer requires reduced latency and response time. In contrast, if a customer and/or service requires higher fault tolerance and data durability, the number of nodes 104 in the data replication group 112 may be increased. A management system 106 of the data replication service 102 may be responsible for determining the number of nodes 104 in a particular data replication group. The management system 106 may be a process or other application executed by a host computer system. Furthermore, the management system 106 may be responsible for creation, termination, and assignment of the data replication groups. For example, the management system 106 may determine that a new data replication group is to be created and may communicate with one or more other service (not shown in FIG. 1 for simplicity) of the computing resource service provider in order to create the new data replication group 112. The management system 106 may also be responsible for assigning and/or associating a particular data replication group 112 to a customer or other service.

Returning to the log system 110 described above, logs 114 from the nodes 104 may be pushed to the log system 110 and/or a data store included and/or managed by the log system 110. From the log system 110 and/or data store, the logs 114 may be published to a stream or other information feed managed by a stream service, described in greater detail below. The stream service may allow clients to subscribe to the stream or other information feed and perform event driven operations based at least in part on information included in the stream or other information feed. For example, the client could receive an event indicating that a particular piece of data has been deleted for a particular data replication group 112 and could perform cleanup operations to delete associated data that is no longer needed. The log system 110 may aggregate the logs 114 obtained from various nodes 104 from a plurality of the data replication groups 112 managed by the replication group service 102. In another example, the log system 110 may aggregate the logs 114 obtained from the nodes 104 of the data replication group 112 of a particular network or zone, such as an availability zone or fault zone, which may allow customers to consume the event from a single stream. The logs 114 may be placed in a database or other data store maintained by the log system 110 and/or a computing resource service provider. The database or other data store may be queryable such that the client may query the log system 110, for example via the interface 108, for information corresponding to one or more data replication groups 112.

In one particular example, the data replication groups 112 may maintain state information corresponding to a current master storage device in a redundant data storage system. Clients can query to the database and/or log system 110 to determine information corresponding to the current master. In some embodiments, the value stored may be an internet protocol (IP) address of the current master. Other examples of a key-value store or other information maintained by the data replication groups 112 which may be determined from the logs 114 are within the scope of the present disclosure. Furthermore, as described above, the logs 114 generated by nodes 104 of the data replication groups 112 may be a product of the consensus protocol. As a result, the log may include operations performed in accordance with replicating state across the data replication group. This enables clients to query the log system 110 in order to determine information maintained by the data replication group.

In some embodiments, the data replication groups 112 implement the Paxos consensus protocol; in such embodiments the logs 114 include at least the proposal number of committed operations. The proposal number may be a unique identifier, relative to the data replication group 112, and may be a continually increasing number (e.g., the proposal number may start with 1 and increase by some number greater than zero for each new proposal and no two proposals may have the same proposal number). The logs 114 could include any operation performed by the nodes, including heartbeat operations, and messages. The logs 114 could further include a timestamp or other time information. Furthermore, the logs 114 may include a result of the operation or whether the operation completed successfully. A log pusher, described in greater detail below, may be executed on the server computer systems responsible for executing the nodes 104 and may, at the expiration of an interval of time, obtain one or more batches of logs 114 persisted by the nodes 104 and transmit the logs 114 to the log system 110 and/or data storage device or other data storage system indicated by the log system 110. The data storage device or other data storage system may enable the storage and processing of streaming data. In such embodiments, the data (e.g., the logs 114) streamed to the data storage device or other data storage system may be continuously collected, stored, and processed.

The log system 110 may process the logs 114, for example, the log system 110 may delete health checks and heartbeat data included in the logs 114. The log system 110 could process the logs 114 to extract the key-value information and/or updates to the key-value information. The log pusher may maintain a cursor location or other location information corresponding to the last batch of logs 114 obtained from the nodes 104. Furthermore, the nodes 104 may maintain a ring buffer or other memory configured to automatically trim and/or delete logs 114 based at least in part on a trigger, for example, the expiration of an interval of time or the writing of a certain amount of data to memory.

Figure 2:
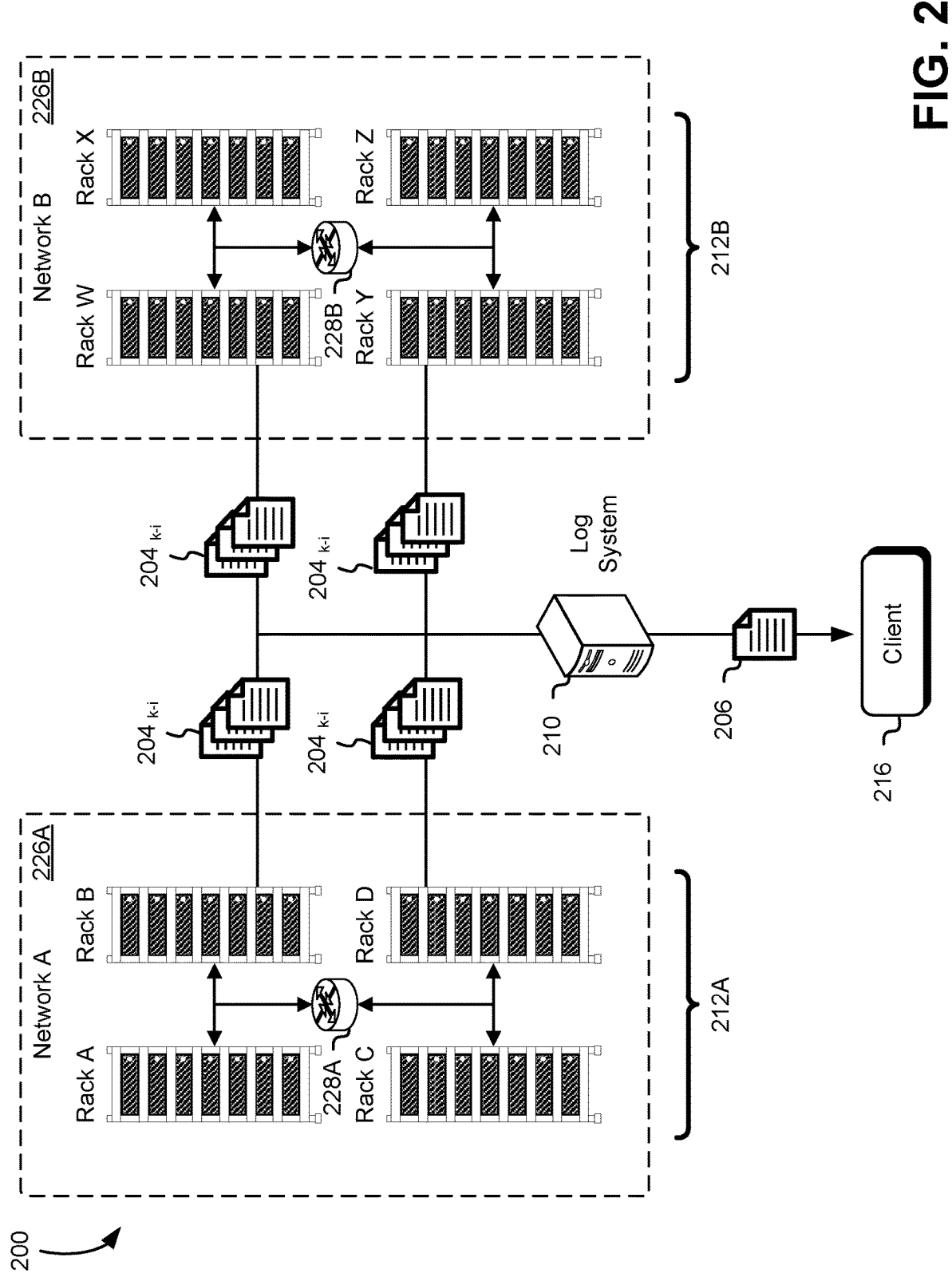
FIG. 2 illustrates aspects of a log system with manages and processes logs associated with data replication groups distributed across various server computer systems in accordance with at least one embodiment.

FIG. 2 illustrates an aspect of an environment 200 in which an embodiment may be practiced. Specifically, FIG. 2 depicts the collection and processing of logs 204 generated by nodes of data replication groups to enable clients 216 to perform event-driven operations. The environment 200 may include a log system 210 that receives one or more logs 204 from nodes executed by servers in the sets of racks 212A-212B. The nodes may be placed on the service according to a rack diversity constraint, where the sets of racks 212 may be localized by different networks 226A-26B. The logs 204 may include various logs $204_{k-i}$ obtained from different nodes executed by the servers in the sets of racks 212A-212B. The log system 210 may be a computing system of one or more computing systems configured to obtain logs 204 generated by nodes of one or more data replication groups as described above in conjunction with FIG. 1. Furthermore, the log system 210 may include computer systems configured to process the logs 204 and generate processed logs 206 which may be consumed by a client 216, for example, as a stream of data.

The sets of racks 212A-212B may be physical hardware configured to host one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on). The servers in a rack may be members of a particular network. In some implementations, multiple racks of servers may be members of the same network. For example, as illustrated in FIG. 2, the servers of the set of racks 212A share the network 226A. Likewise, the servers of the set of racks 212B share the network 226B. Additionally, the set of racks 212A and 212B may be a "brick server" or other server that is a compact computer server module without a chassis that may include various processors, RAM, I/O, and storage configurations and may be designed to fit into various rack locations. The set of racks 212A and 212B may also be connected by a top of rack switch.

The networks 226A-26B may be data communication pathways between one or more electronic devices. The networks 226A-26B may be wired or wireless networks and may use any of a variety of communications protocols for organizing their network traffic. The networks 226A-26B may allow the sharing of files, data, and other types of information between the one or more electronic devices accessible through the data communication pathways. Each of the networks 226A-26B may be associated with a router, such as an aggregation router that aggregates the servers of the respective set of racks into the common network, separate from the router associated with the other network. Each of the networks 226 A-26B may be on a different subnet than the other network. For example, as illustrated in FIG. 2, the servers of the set of racks 212A may be commonly connected to a router 228A. Similarly, the servers of the set of racks 212B may be commonly connected to a router 228B. The routers 228A-28B may be networking devices that forward packets between computer networks, such as between the networks 226A-26B.

The log system 210 may also include a data warehouse or data storage system that stores the processed logs 204 and/or logs 204 such that the logs may be queried. In this manner, the client may be able to query the processed logs 204 and/or logs 204 for information as well as being provided information corresponding to the processed logs 204 and/or logs 204 through a data stream. In various embodiments, the data stream includes the processed logs 204 and/or logs 204. The client 216 may be a computer system operated by a user and/or customer, for example, a customer of a computing resource service provider. Additionally, client 216 may be another service or computer system of the computing resource service provider. For example, nodes of the data replication groups executed by the servers on racks 112A and 112B may store location information for customer computer systems, the client 216 may a service of the computing resource service provider configured to locate customer computer systems. In order to locate the customer computer systems, the client 216 may query the log system 210 for information associated with the customer computer system, for example, by querying for a particular key or other information associated with the customer computer system.

Figure 3:
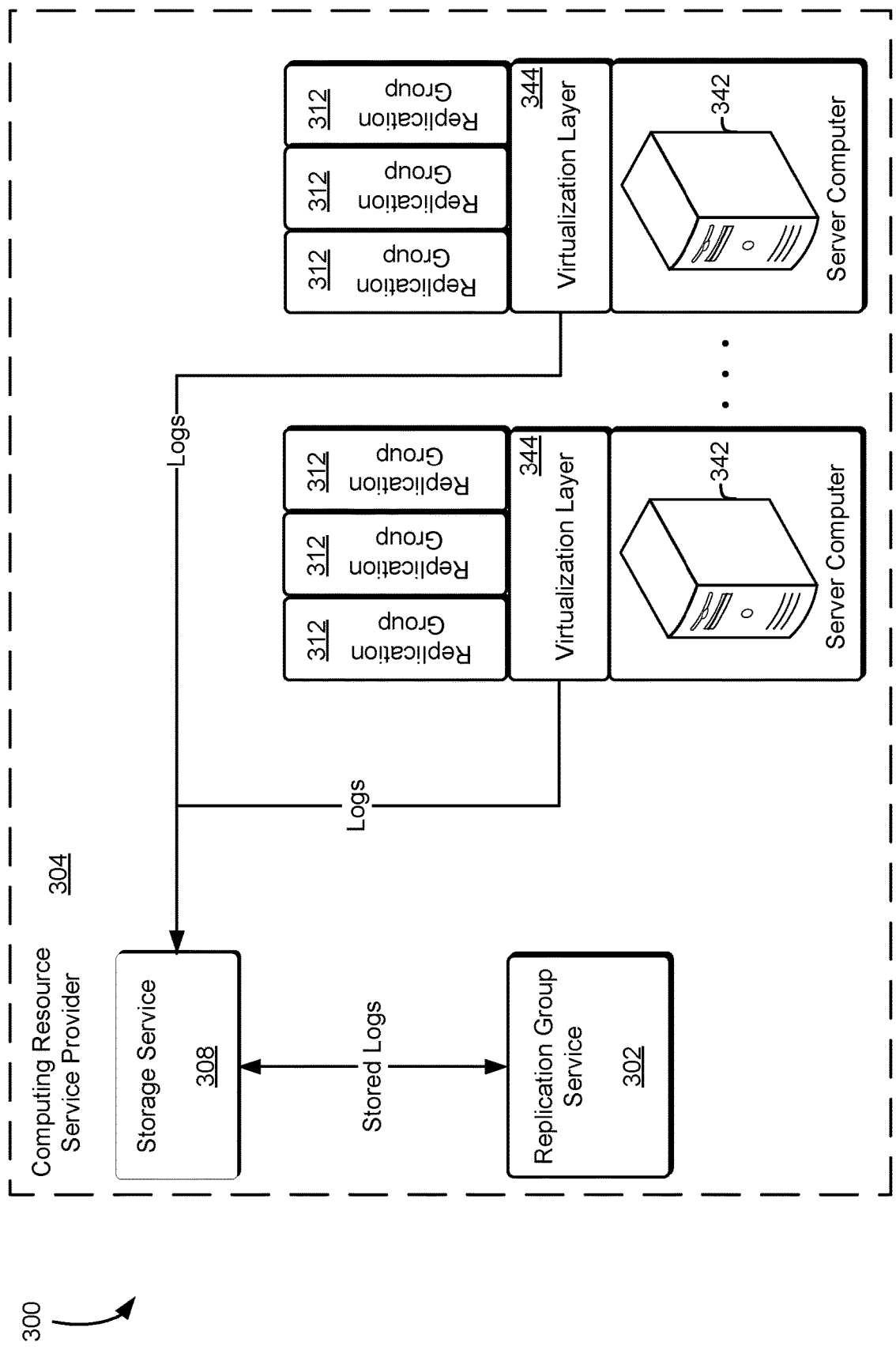
FIG. 3 illustrates an environment in which various aspects of management and processing of logs associated with data replication groups may be implemented in accordance with at least one embodiment.

FIG. 3 illustrates a replication group service 302 of a computing resource service provider environment 300 in accordance with at least one embodiment. The replication group service 302, which may be implemented by physical hardware, is used by a computing resource service provider 304 to provide durable storage resources for customers and/or other services of the computing resource service provider 304. The replication group service 302 may include a group of computing systems, such as the server computers 342 described in detail below, configured to manage and provide data replication groups 312 for use by customers or other services of the computing resource service provider 304. The physical hardware may include a server computer 342. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 344 may include a bare metal hypervisor or a hosted hypervisor. The virtualization layer 344 executing on the service computer 342 enables the physical hardware to be used to provide computational resources upon which one or more data replication groups 312 and/or component thereof such as a node, master node, or new node as described above may operate. For example, the virtualization layer 344 enables a particular node of a data replication group 312 to access physical hardware on the server computer 342 through virtual device drivers or other executable code on the node. The virtualization layer 344 may include a hypervisor or virtualization software and/or hardware. The virtualization layer 344 may also include an instance of an operating system dedicated to administering the data replication group 312 or component thereof running on the server computer 342. Each virtualization layer 344 may include its own networking software stack, responsible for communication with other virtualization layers 344 and, at least in some embodiments, also responsible for implementing network connectivity between the data replication group 312 or components thereof running on the server computer 342 and other data replication group 312 running on other server computers 342.

Furthermore, the server computer 342 may host multiple virtualization layers 344 of the same or different types on the same server computer 342 as well as data replication groups 312 of the same or different types. For example, a server computer system 342 may host a first node of a first data replication group 312 and may host a second node that is a member of a second data replication group 312. The virtualization layer 344 may be any device, software, or firmware used for providing a virtual computing platform and/or virtualized computing resources for the data replication group 312 and/or component thereof. The virtual computing platform may include various virtual computer components, such as one or more virtual CPUs, virtual memory, and the like. The data replication group 312 may be provided to the customers or other service of the service provider 304 and the customers may store data or other information on the data replication group 312 or component therefor. Further, the computing resource service provider 304 may use one or more of its own data replication group 312 for supporting execution of its applications and providing storage for such applications.

Commands and other information may be included in an application program interface (API) call from the replication group service 302 or a storage service 308, described in greater detail below, to the virtualization layer 344. The replication group service 302 enables the customers and other services of the computing resource service provider 304 to manage and operate the data replication group 312. For example, the client may transmit a request to the replication group service 302 to obtain log information corresponding to a particular data replication group 312. The request may be an API call including information corresponding to the client, the storage service 308, or the particular data replication group 312. The replication group service 302 may determine the corresponding virtualization layer 344 for the data replication group 312 included in the request and transmit a command to the virtualization layer 344 to obtain operation logs stored locally by the data replication group 312.

A log pusher (not shown in FIG. 3 for simplicity) may be used to obtain logs stored locally by the data replication groups 312. In various embodiments, the log pusher, described in greater detail below, obtains logs from the data replication groups and stores the logs in one or more storage devices of a storage service 308. The log pusher may be a process or other executable code supported by the virtualization layer 344. The storage service may be a group of computer systems configured to store data that is accessible to one or more other computer systems, such as the replication group service 302. In this way, log information maintained by the storage service 304 may be accessed by the replication group service 302 and/or clients. The storage service 308 may be a data warehouse or a non-queryable data storage system. A data storage system and/or data storage device is queryable if data storage system and/or data storage device enable requestors to submitted data queries and receive response to the submitted data queries. For example, the storage service 308 may be a database, such as an Structured Query Language (SQL) database, which enables clients to query the storage service 308 for information contained in the logs and stored by the storage service 308. In another example, the storage service 308 may be non-queryable, in so much as, the storage service 308 stores the log files as data objects which are obtainable by a data object identifier, such as a file name or key, but does enable queries on information contained in the log files.

The replication group service 302 may be responsible for processing the logs obtained from the data replication groups 312. The replication group service 302 may include a log collector, described in greater detail below, configured to obtain logs from the storage service 308. In addition, the log collector may be configured to cause processed logs to be stored by the storage service 308. For example, the replication group service 302 may obtain stored logs from the storage service and may process the log by at least removing duplicate entries and/or heartbeat or other messages included in the log. The logs may contain duplicate entries as a result of the data replication groups 312 containing a plurality of nodes. The logs may also be processed such that only committed and/or performed operations are maintained in the processed logs (e.g., the processed logs contain only operations performed by the nodes of the data replication groups). These processed logs may in turn be stored by the storage service 308.

Figure 4:
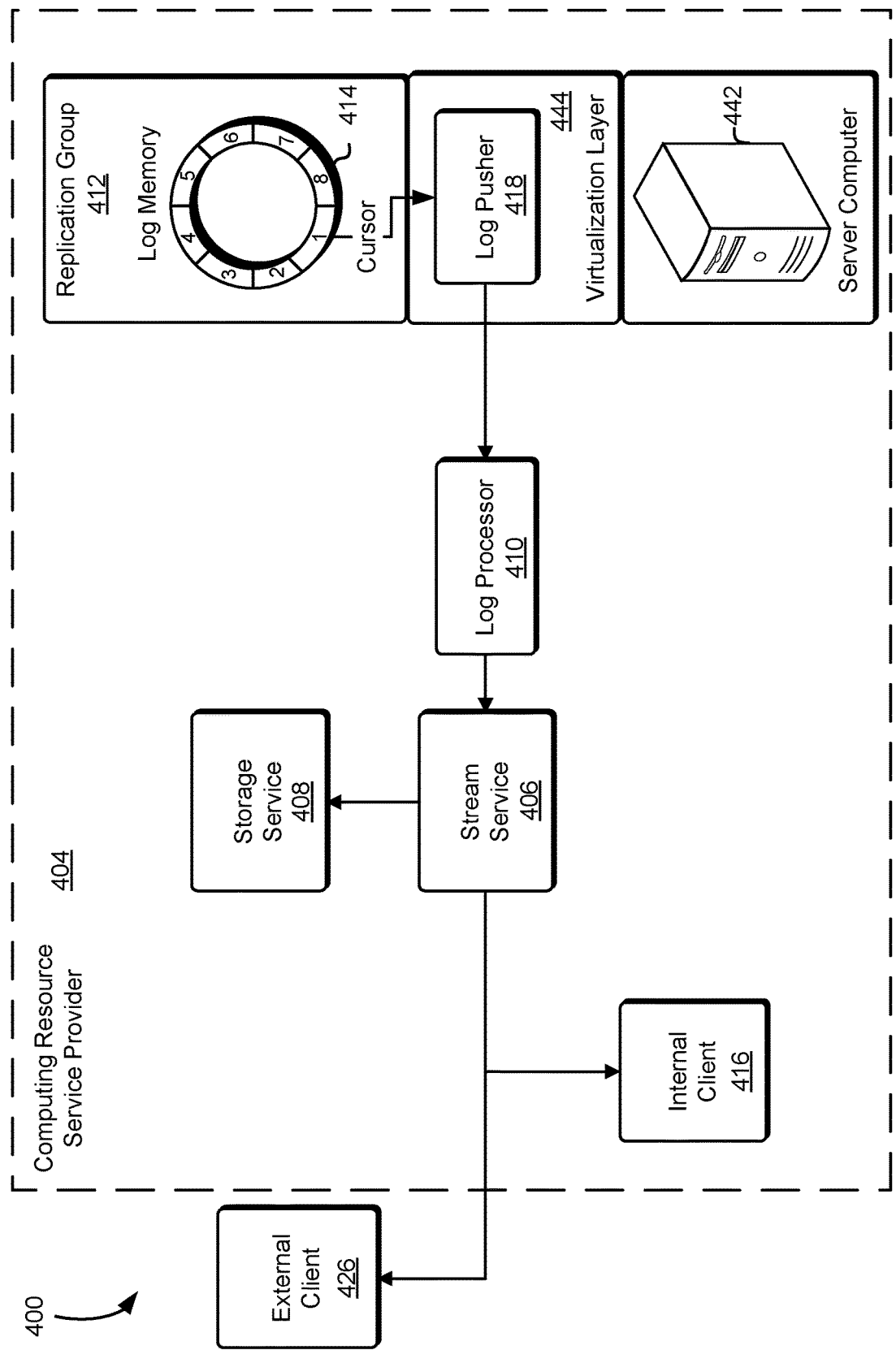
FIG. 4 illustrates an environment in which various aspects of management and processing of logs associated with data replication groups may be implemented in accordance with at least one embodiment.

FIG. 4 illustrates a computing resource service provider 404 environment 400 which enables clients to access log information generated by a data replication group 412 in accordance with at least one embodiment. Various services and systems illustrated in FIG. 4 may be implemented by physical hardware, and used by a computing resource service provider 404 or component thereof, such as the data replication service as described above, to obtain, process, and manage log information generated by one or more nodes of the data replication group 412. The physical hardware may include a server computer 442. The server computer 442 may be any device or equipment configured to execute instructions for performing data computation, manipulation, or storage tasks, such as a computer or a server. A server computer 442 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 444 may include a bare metal hypervisor or a hosted hypervisor. The virtualization layer 444 executing on the service computer 442 enables the physical hardware to be used to provide computational resources upon which one or more data replication groups 412 and/or component thereof such as a node, master node, or new node as described above may operate. In addition the virtualization layer 444 may provide computational resources for a log pusher 418, described in greater detail below. For example, the virtualization layer 444 enables a particular node of a data replication group 412 to access physical hardware on the server computer 442 through virtual device drivers or other executable code on the node. The virtualization layer 444 may include a hypervisor or virtualization software and/or hardware. The virtualization layer 444 may also include an instance of an operating system dedicated to administering the data replication group 412 or component thereof running on the server computer 442 or other applications such as the log pusher 418 running on the server computer 442. Each virtualization layer 444 may include its own networking software stack, responsible for communication with other virtualization layers 444 and, at least in some embodiments, also responsible for implementing network connectivity between the data replication group 412 or components thereof running on the server computer 442 and other data replication group 412 running on other server computers 442. For example, the log pusher 418 may transmit logs obtained from nodes implemented by the server computer 442 over a network connection established by the virtualization layer 444.

Furthermore, the server computer 442 may host multiple virtualization layers 444 of the same or different types on the same server computer 442 as well as data replication groups 412 of the same or different types. For example, a server computer system 442 may host a first node of a first data replication group 412 and may host a second node that is a member of a second data replication group 412. The virtualization layer 444 may be any device, software, or firmware used for providing a virtual computing platform and/or virtualized computing resources for the data replication group 412 and/or component thereof. The virtual computing platform may include various virtual computer components, such as one or more virtual CPUs, virtual memory, and the like. The data replication group 412 may be provided to the customers or other service of the service provider 404 and the customers may store data or other information on the data replication group 412 or component therefor. Further, the computing resource service provider 404 may use one or more of its own data replication group 412 for supporting execution of its applications and providing storage for such applications.

Commands and other information may be included in an API call from the replication group service or a storage service 408 to the virtualization layer 444. The storage service 408 may include a group of computing systems, such as the server computers 442, configured to manage and store data on behalf customers or other services of the computing resource service provider 404. The server computers 442 implementing the storage service 408 may include a group of storage devices or databases configured to maintain the data on behalf customers or other services of the computing resource service provider 404. The replication group service enables the customers and other services of the computing resource service provider 404 to manage and operate the data replication group 412. For example, the client may transmit a request to the replication group service to obtain log information corresponding to the data replication group 412. In another example, the client may transmit a request to a stream service 406 to subscribe to an event stream corresponding to the log information generated by the data replication group 412. The request may be an API call including information corresponding to the client, the storage service 408, the data replication group 412, a particular key associated with the data replication group 412 or data stored by the data replication group 412, or any other information suitable for identifying the data replication group 412. The replication group service may determine the corresponding virtualization layer 444 for the data replication group 412 included in the request and transmit a command to the virtualization layer 444 to obtain operation logs stored locally by the data replication group 412. The clients may include internal clients 416 and external clients 426. Internal clients 416 may include computer systems operated by the computing resource service provider 404. External clients 426 may include computer system operated by individuals and organizations other than the computing resource service provider 404. However, the computer systems operated by the external client 426 may include computer systems provided by the computing resource service provider 404, such as virtual computing systems provided to customers.

The logs may be obtained by the log pusher 418 which may be a process, application, or other executable code maintained in memory of the server computer 442. In various embodiments, the log pusher 418 is configured to periodically or aperiodically wake (e.g., execute on the server computer system) and obtain one or more batches of logs from the data replication group. The logs may be stored in a log memory 414 maintained by the nodes of the data replication group 412. Each node may maintain a log memory 414 locally to the node. As illustrated in FIG. 4, the log memory 414 may be configured as a ring buffer. Organizing the log memory 414 in this manner may eliminate the need for a node to trim and/or delete a portion of the logs the node maintains, for example, as a result of a command from the log pusher 418 or other computer system. Furthermore, the log pusher 418 may maintain a cursor or other location information to indicate portions of the logs that have not been obtained by the log pusher 418.

The log pusher 418 may provide the obtained logs to a log processor 410. The log processor 410 may be an application or other executable code configured to process the logs received from the log pusher 418. Furthermore, the log processor 410 may include a group of computing systems, such as the server computers 442, configured to execute the application or other executable code corresponding to the log processor 410. The log processor 410 may be a component of the replication group service or of the stream service 406. For example, the log processor 410, may be a script configured to be executed by the stream service and extract relevant information from the logs obtained from the log pusher 418. In various embodiments, the log processor 410 is provided by the client and is configured to extract information from the log that the client has determined is important. In this manner the client may customize the stream generated by the stream service 406 to include information relevant to the client. For example, if the client is only concerned with a particular key or data object, the client may provide the log processor 410 with a script that extracts all log entries corresponding to the particular key or data object.

The stream service 406 may include one or more computer systems configured to publish data to one or more subscribers. The data may be published in streams and enables processing of the data, event driven operations, and analysis of the data provided in the stream. The stream service 406 may be implemented by a group of server computers 442 configured to stream log data to subscribers, such as internal clients 416 and external clients 426. The streams may be associated with keys or other information such that clients may subscribe to the data streams using the keys. Clients may include internal clients 416 and external clients 426. In addition, the stream service 406 may provide the storage service 408 with stream for storage. For example, the stream service 406 may provide clients with a data stream of log events generated by the log processor 410 as well as provide the storage service with the data stream for persistent storage. The data stream may include the logs or a portion of the logs generated by the data replication group 412. The data stream may contain sufficient information to restore the current state of the data replication group 412. In addition, the stream service 406 may provide the client with a variety of other features. For example, the stream service 406 enables the client to replay or otherwise repeat the data provided in the data stream by the stream service 406.

Figure 5:
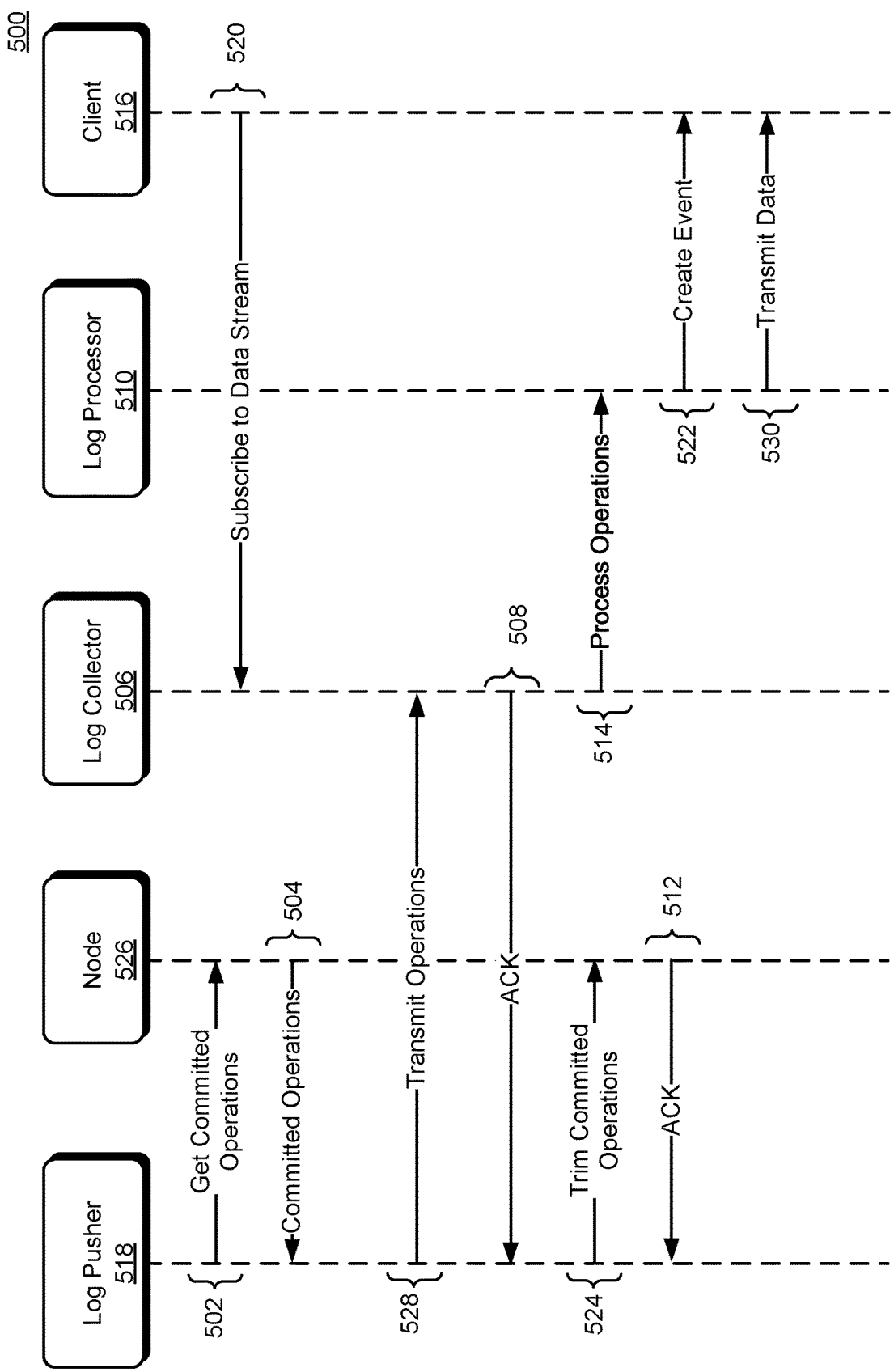
FIG. 5 illustrates a messaging diagram in which various aspects of management and processing of logs associated with data replication groups may be performed in accordance with at least one embodiment.

FIG. 5 illustrates a messaging diagram 500 between various components of a log processing system configured to provide clients with log information obtained from nodes of a data replication group. A log pusher 518, as described above, may transmit a request to a node 526 to get committed operations 502. The log pusher 518 may be configured to, at the expiration of an interval of time, transmit the request to get committed operations 502. The committed operations may include any operating performed by the node 526. Furthermore, the requests transmitted between the entities illustrated in the messaging diagram 500, including the log pusher 518 and the node 526, may include API calls or other commands and/or messages transmitted over a network connection between the entities.

Returning to FIG. 5, in response to request to get committed operations 502, the node 526 may provide the log pusher 518 with a log of committed operations 504. In various embodiments, the log pusher 518 may obtain the committed operations from memory of the node 526. The log pusher may obtain the entire log generated by the node 526 or may obtain portions of the log over time in batches. Once the log pusher 518 has received the committed operations 504, the log pusher may then transmit the committed operations 528 to a log collector 506. The log collect 506 may include a computer system configured to obtain logs and store the logs for processing and streaming to a client 516. Furthermore, to obtain data corresponding to the logs the client 516 may subscribe to the data stream 520 by transmitting a request to the log collector 506 to obtain such data. Once the log collector 506 has received the committed operations from the log pusher 518, the log collector 506 may provide the log pusher 518 with an acknowledgment 508 that the committed operations have been received.

The log pusher 518 may utilize the acknowledgment 508 to update a cursor or other information indicating which committed operations of the node 526 the log pusher 518 has obtained. This log pusher 518 may track the committed operations that have been obtained in order to determine which batches of the committed operations made by the node 526 have been obtained and which batches are still to be obtained. Furthermore, the node 526 may periodically or aperiodically trim the committed operations log, for example, by storing the logs in a ring buffer as described above. In these embodiments, the log pusher 518 utilizes the cursor to determine which logs to obtain before they are trimmed or otherwise lost (e.g., copied over in the nodes 526 ring buffer).

Returning to FIG. 5, once the acknowledgment 508 is received, the log pusher 518 may transmit a command to the node 526 to trim the committed operations. In this way, the node 526 may reduce the size of the log and reduce the amount of computing resources used by the node 526. The node 526 may transmit an acknowledgment 512 indicating that the committed operations have been trimmed or otherwise deleted. Returning to the log collector 506, discussed above, once the log collector 506 have obtained the committed operations, the log collector 506 may transmit a command to a log processor 510 to process the committed operations 514. The log processor 510 may be configured to extract information from the committed operations. For example, the log processor 510 may be configured to extract updates to a particular key of a key value store maintained by the node 526.

The log processor 510 may generate events from the extracted information obtained from the committed operations. Returning to the example above, the log processor 510 may determine that a value associated with the particular key has been updated and may create an event indicating the value or indicating the value associated with the particular key have been modified. The log processor 510 may create an event 522 and provide the event to the client 516. The log processor 510 may then transmit data corresponding to the created event to the client 516. In various embodiments, the client 516 may request the data once receiving the created event.

Figure 6:
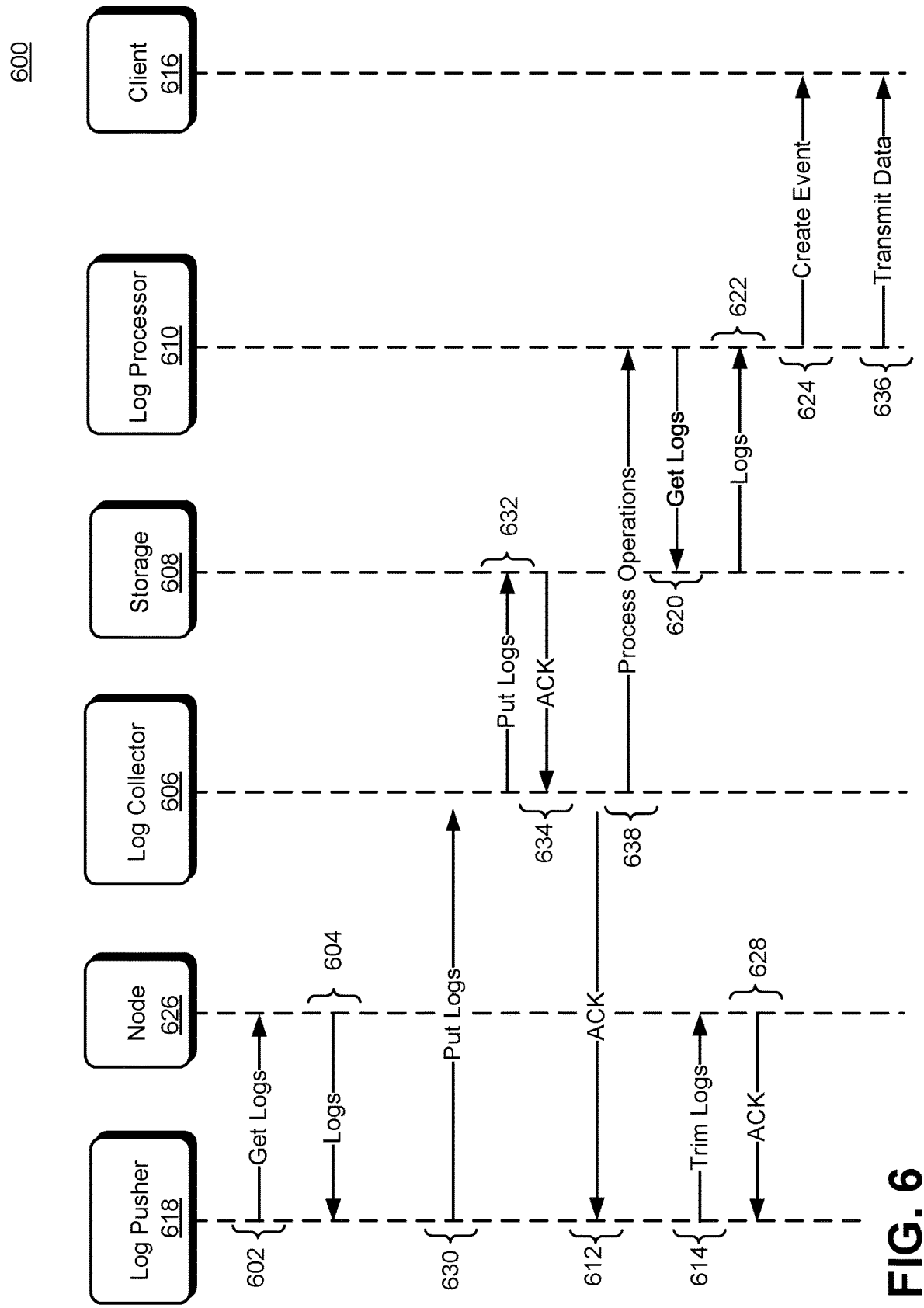
FIG. 6 illustrates a messaging diagram in which various aspects of management and processing of logs associated with data replication groups may be performed in accordance with at least one embodiment.

FIG. 6 illustrates a messaging diagram 600 between various components of a log processing system configured to provide clients with log information obtained from nodes of a data replication group. A log pusher 618, as described above, may transmit a request to a node 626 to get logs 602. The log pusher 618 may be configured to at the expiration of an interval of time transmit the request to get committed operations 602. The logs may include committed operations performed by the node 626 or any other messages or operations performed by the node 626. The committed operations may include any operations performed by the node 626. Furthermore, the requests transmitted between the entities illustrated in the messaging diagram 600, including the log pusher 618 and the node 626, may include API calls or other commands and/or messages transmitted over a network connection between the entities.

Returning to FIG. 6, in response to request to get the logs 602, the node 626 may provide the log pusher 618 with a log 604 of committed operations. In various embodiments, the log pusher 618 may obtain the committed operations from memory of the node 626. The log pusher may obtain the entire log generated by the node 626 or may obtain portions of the log in batches. Once the log pusher 618 has received the logs 604, the log pusher 618 may then transmit the logs 630 to a log collector 606. The log collector 606 may include a computer system configured to obtain logs and store the logs for processing and streaming to a client 616. Furthermore, to obtain data corresponding to the logs the client 616 may subscribe to the data stream by transmitting a request to the log collector 606 and/or log processor 610 to obtain such data. Once the log collector 606 has received the committed operations from the log pusher 618, the log collector 606 may provide the logs 632 to a storage system 608. The storage system 608 may be a queryable or non-queryable storage system as described above.

The storage system 608 may provide the log collector 606 with an acknowledgment 634 that the logs have been received and stored. In turn, the log collector 606 may provide the log pusher 518 with an acknowledgment 612 that the logs have been stored with the storage system 608. The log pusher 618 may utilize the acknowledgment 612 to update a cursor or other information indicating which committed operations of the node 626 the log pusher 618 has obtained. This log pusher 618 may track the committed operations that have been obtained in order to determine which batches of the committed operations generated by the node 626 have been obtained and which batches are still to be obtained. Furthermore, the node 626 may periodically or aperiodically trim the committed operations log, for example, by storing the logs in a ring buffer as described above. In these embodiments, the log pusher 618 utilizes the cursor to determine which logs to obtain before they are trimmed or otherwise lost (e.g., copied over in the nodes 626 ring buffer).

Returning to FIG. 6, once the acknowledgment is received, the log pusher 618 may transmit a command to the node 626 to trim the committed operations. In this way, the node 626 may reduce the size of the log and reduce the amount of computing resources used by the node 626. The node 626 may transmit an acknowledgment 628 indicating that the logs have been trimmed or otherwise deleted. Returning to the log collector 606, discussed above, once the log collector 606 has received the acknowledgment that the storage system has stored the logs, the log collector 606 may transmit a command to a log processor 610 to process the committed operations 638. The log processor 610 may be configured to extract information from the logs. For example, the log processor 610 may be configured to extract operations performed by the nodes 626 that are performed on data maintained by the data replication group. In another example, the log processor 610 may be configured to extract operations performed in implementing the consensus protocol for debugging and testing the operation of the consensus protocol.

The log processor 610 may generate events for the extract information obtained from the committed operations. Returning to the example above, the log processor 610 may determine that a value associated with the particular key has been updated and may create an event indicating that the value has been updated or indicating that the value associated with the particular key have been modified. The log processor 610 may create an event 624 and provide the event to the client 616. The log processor 610 may then transmit data corresponding to the created event to the client 616. In various embodiments, the client 616 may request the data once receiving the created event.

Figure 7:
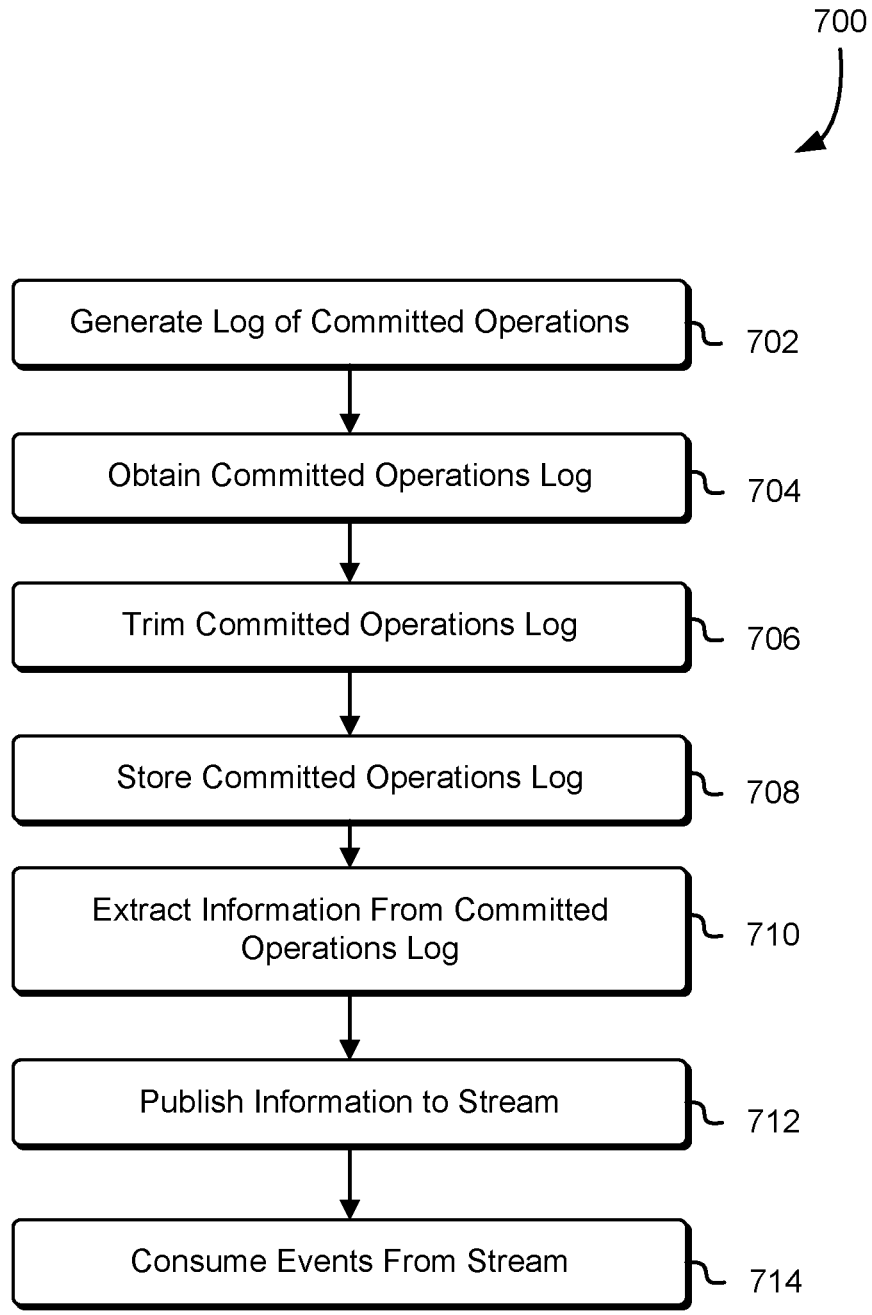
FIG. 7 shows an illustrative process which may be used to manage and process logs associated with data replication groups in accordance with at least one embodiment.

FIG. 7 is a block diagram illustrating an example of a process 700 for consuming log events from a stream of data in accordance with at least one embodiment. The process 700 may be performed by any suitable system such as a streaming processing service and data replication group or other components of a computing resource service provider as described above in connection with FIG. 4. The process 700 includes generating, by one or more nodes of a data replication group, a log of committed operations 702. The log may include operations of data maintained by the nodes of the data replication group. For example, the operations may include updating a value in a key-value store maintained by the data replication group. A log pusher, as described above, may obtain the committed operations log from the nodes of the data replication group 704. The logs may be maintained in memory of the nodes and the log pusher may have access to the memory of the nodes. For example, the log pusher may be a process or other application executed by the same server computer systems executing the nodes. As a result, the log pusher may obtain access to the memory of the node either directly or through a virtualization layer as described above.

Once the logs have been obtained in step 704, the log pusher or other system may transmit a command to the nodes to trim the committed operations logs 706. The command may include an identifier of the logs collected and an indication that the collected logs may be deleted from the memory of the nodes. The log pusher may then cause the committed operations log to be stored 708. For example, the logs may be stored in a storage system as described above. A log processor or other computer system may extract information from the committed operations log 710. The information may be extracted directly from logs obtained from the log pusher or may be obtained from the logs persisted by the storage system. The extracted information may include information indicated by a client as important information. For example, the client may indicate that any change in data maintained by the data replication group is an event the client would like included in an event stream.

The extracted information obtained in step 710 may be published to an event stream or other data stream 712. The event stream may be managed by a stream service as described above. The event stream may include a portion of the information extracted from the committed operations logs. In addition, a log processor or other computer system may further trim or otherwise manage the extracted information such that only information indicated by the client as important is included in the event stream. Once events have been published to the event stream, clients may consume events from the stream 714. Publishing the events may include distributing information corresponding to the event to all the clients who have subscribed to the event stream. Furthermore, consuming the event 714 may include obtaining data corresponding to the event published to the event stream and/or performing various operations based at least in part on the published event.

Figure 8:
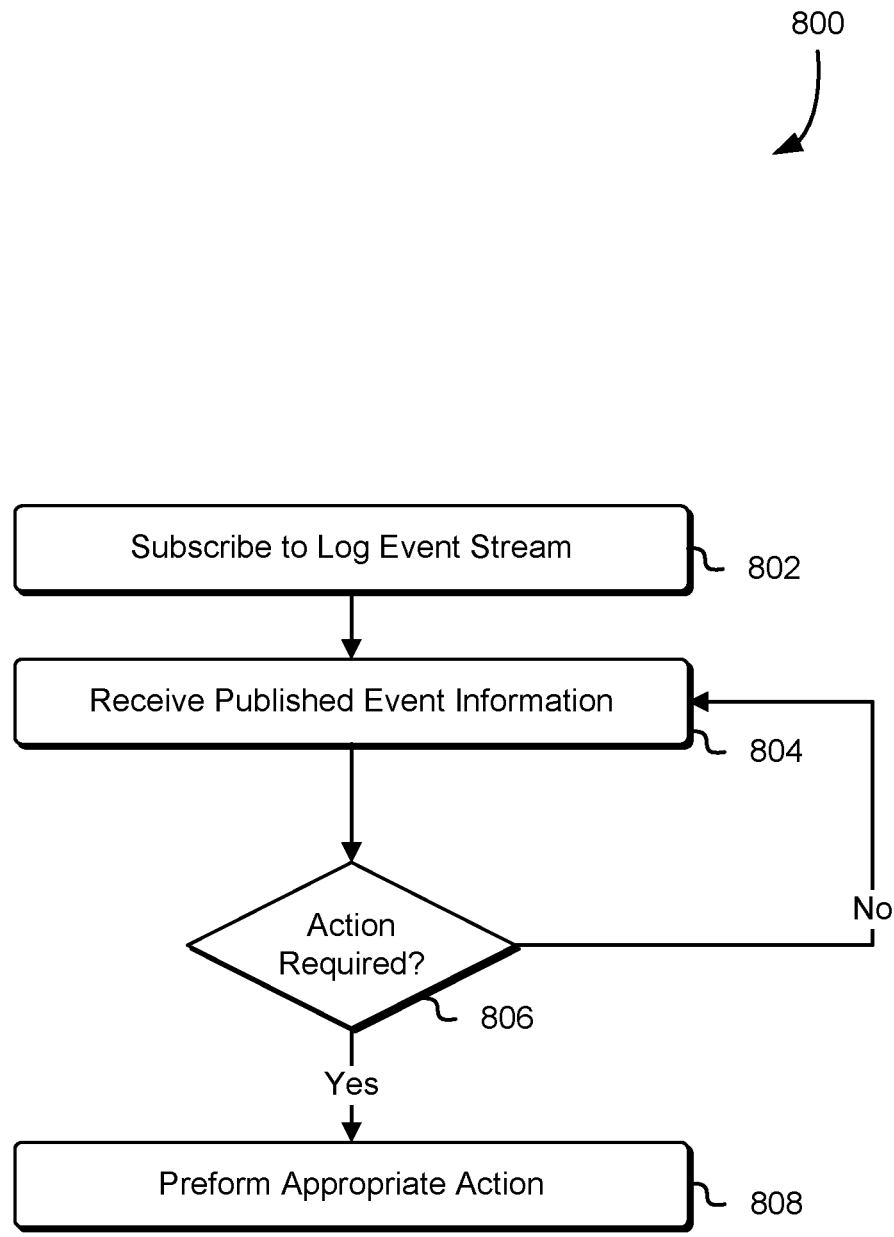
FIG. 8 shows an illustrative process which may be used to subscribe to an event stream and perform event-driven actions based at least in part on log events of a data replication group in accordance with at least one embodiment.

FIG. 8 is a block diagram illustrating an example of a process 800 for performing an action based at least in part on an event published to an event stream corresponding to a log obtained from a data replication group in accordance with at least one embodiment. The process 800 may be performed by any suitable system such as an internal or external client and stream service or other component of a computing resource service provider as described above in connection with FIG. 4. The process 800 includes subscribing to a log event stream 802. Subscribing to the event stream may include transmitting a request to a stream service indicating one or more data replication groups. The stream service may be responsible for publishing event information to clients 804. Publishing event may include transmitting information associated with log events to clients who have subscribed to the event stream. Log events may include any action or operation included in the log or any action or operation extracted from the log. For example, the event may include an update to a value or other data maintained by the data replication group.

The client or other system receiving the published event may determine if an action associated with the event is required 806. If an action is required the client or other computer system may perform the action 808. Clients may also include other services of the computing resource service provider. For example, the data replication groups may maintain information corresponding to volume pairs maintained by a storage service and the other services of the computing resource service provided may determine if the volume has moved, has lost a replica (e.g., the volume pair), up to date volume information, historical events of the volume, current location, current master location, or other information associated with the volume pairs that may be used by the computing resource service provider to manage the volume pairs. In another example, the actions may include providing the event information to a data warehouse or archival storage. Other actions may include updating client information based at least in part on the event. For example, the client may maintain information associated with data maintained by the data replication group. The event may indicate that the data has been deleted, and as a result, the action performed by the client may include deleting the data associated with the data deleted from the data replication group. If no action is required, the client may simply wait to receive another event.

Figure 9:
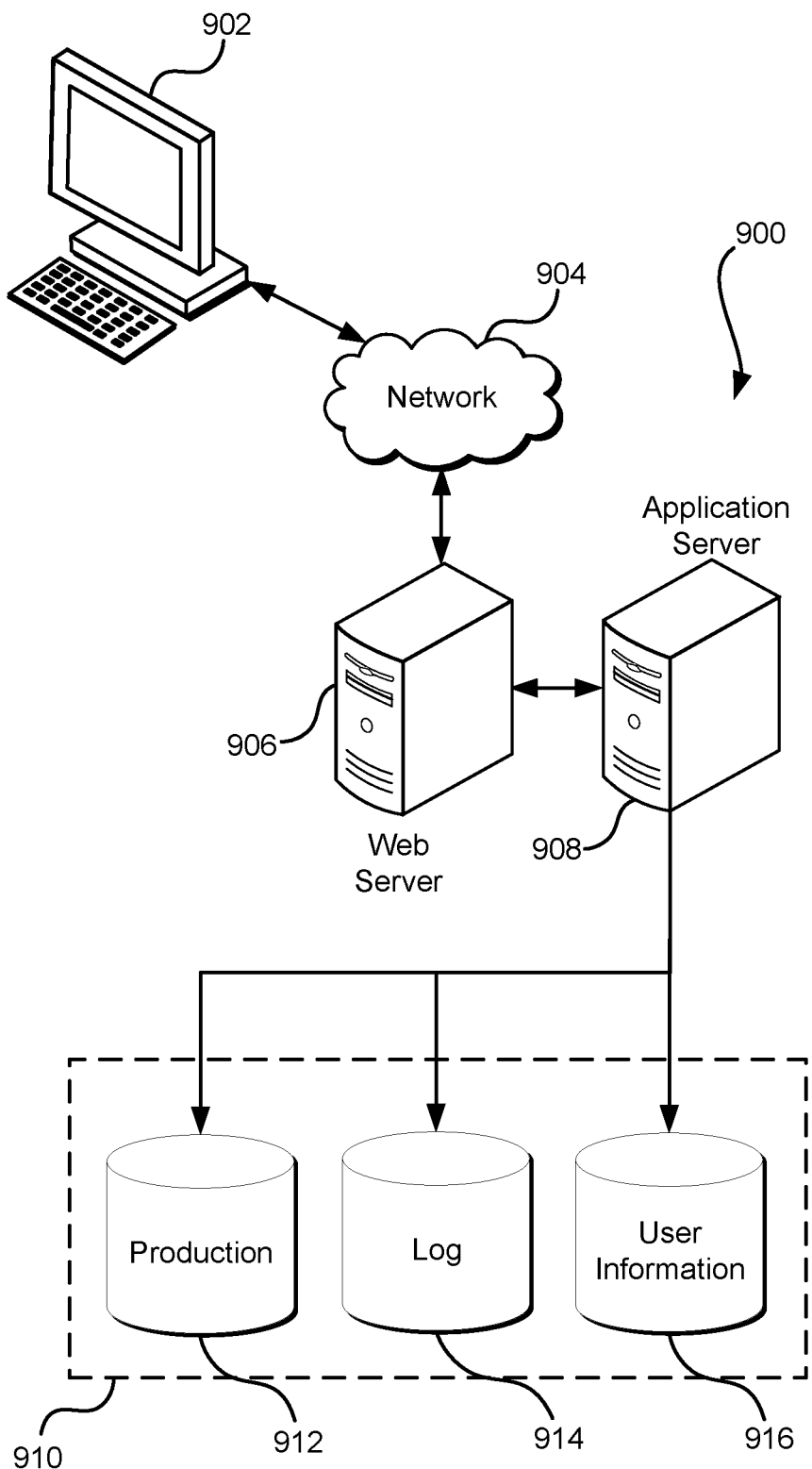
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a subscription request to subscribe to an event stream associated with log events of one or more data replication groups, the one or more data replication groups comprising a plurality of nodes configured to store data replicated across the plurality of nodes, with each of the nodes being a separate virtual computing process running on a different separate physical host and implementing a consensus protocol enabling data replication between the plurality of nodes;
obtaining a batch of logs containing committed operations performed by the plurality of nodes defining a data replication group of the one or more data replication groups, the batch of logs having information sufficient to:
 generate a timeline of a plurality of updates to values of a record in a key-value store of at least one node of the plurality of nodes over a time period such that the values of a plurality of keys of the key-value store can be determined at an arbitrary point in the time period based on the timeline; and
 reconstruct the data replication group of the one or more data replication groups at the arbitrary point in the time period by replaying a plurality of state-machine transitions that occurred at the plurality of nodes during execution of the data replication group defined by the plurality of nodes, the replaying of the plurality of state-machine transitions of the plurality of nodes including replaying the plurality of updates to values of a record in the key-value store of at least one node of the plurality of nodes;
providing the batch of logs to a log collector;
modifying the batch of logs to reduce the amount of duplicative information contained in the batch of logs by removing redundant log entries, and by removing entries corresponding to periodic health checks of the node and liveliness of the node;
generating one or more events based at least in part on the modified batch of logs; and
making available the generated one or more events to the event stream such that a subscriber obtains information corresponding to the generated one or more events.

2. The computer-implemented method of claim 1, further comprising transmitting a command to the node, the command configured to cause the node to delete the batch of logs maintained locally by the node.

3. The computer-implemented method of claim 1, wherein modifying the batch of logs is performed by a log processor provided by the subscriber, where the log processor is a script configured to remove log entries from the batch of logs as indicated by the subscriber.

4. The computer-implemented method of claim 1, wherein the one or more events correspond to a change in key-value information.

5. The computer-implemented method of claim 1, wherein modifying the batch of logs to reduce the amount of duplicative information contained in the batch of logs by removing redundant log entries further comprises retaining operations performed by the node comprising updates to values maintained as a key-value pair in the data replication group.

6. The computer-implemented method of claim 1, wherein the batch of logs contains committed operations performed by a plurality of nodes of the data replication group, and wherein the redundant log entries comprise duplicative entries from different nodes of the plurality of nodes.

7. A system, comprising:
one or more processors; and
memory that includes instructions that, when executed by the one or more processors, cause the system to:
obtain a batch of logs containing operations performed by at least two nodes of a data replication group executed by a computer system, the at least two nodes being separate virtual computing processes running on different physical hosts and implementing a consensus protocol enabling data replication between a plurality of nodes including the at least two nodes, the batch of logs having information sufficient to:
generate a timeline of a plurality of updates to values of a record in a key-value store of at least one node of the plurality of nodes over a time period such that the values of a plurality of keys of the key-value store can be determined at a point in the time period based on the timeline; and
restore the data replication group at the point in the time period by replaying a plurality of state-machine transitions that occurred during execution of the data replication group including state-machine transitions that occurred at the at least two nodes, the replaying of the plurality of state-machine transitions including replaying a plurality of updates to the key-value store of at least one of the at least two nodes;
remove redundant log entries and entries corresponding to heartbeat operations from the batch of logs, wherein the entries corresponding to the heartbeat operations from the batch of logs further comprise entries indicating at least one of a health status or a liveness of the node;
provide the batch of logs to a stream service; and
cause the stream service to make data available by at least:
generating one or more events based at least in part on the provided batch of logs; and
transmitting the generated one or more events to one or more subscribers of the stream service.

8. The system of claim 7, wherein the memory further includes instructions that, when executed by the one or more processors, cause the system to process the batch of logs to retain operations performed by the node comprising updates to values maintained in as a key-value pair in the data replication group.

9. The system of claim 7, wherein the memory further includes instructions that, when executed by the one or more processors, cause the system to remove redundant log entries and entries corresponding to heartbeat operations from the batch of logs further comprise executable code provided by a client of the stream service.

10. The system of claim 7, wherein the memory further includes instructions that, when executed by the one or more processors, cause the system to, as a result of successfully obtaining the batch of logs, transmit a command to a log pusher to trim a log maintained by the node.

11. The system of claim 7, wherein the memory further includes instructions that, when executed by the one or more processors, cause the system to store the batch of logs in a remote storage system.

12. The system of claim 11, wherein the remote storage system is configured such that the batch of logs maintained in the remote storage system is queryable.

13. The system of claim 11, wherein obtaining the batch of logs further comprises obtaining the batch of logs from the remote storage system prior to removing redundant log entries and entries corresponding to heartbeat operations from the batch of logs.

14. A non-transitory computer-readable storage medium having stored thereon executable instructions that, when executed by one or more processors of a computer system, cause the computer system to at least:
receive a request to subscribe to an event stream associated with one or more data replication groups that comprise a plurality of nodes that are separate virtual computing processes running on different physical hosts and enabling data replication between the plurality of nodes;
obtain a batch of logs from memory of a node of the one or more data replication groups, where the log contains information associated with operations performed by the node, the batch of logs having information sufficient to:
generate a timeline of one or more of updates to one or more values of a record in a key-value store of at least one node of plurality of nodes over a time period such that the values of one or more keys of the key-value store can be determined at a point in the time period based on the timeline; and
recreate the one or more data replication groups at the point in the time period including transitions that occurred at the node during execution of the one or more data replication groups and including updates to the key-value store maintained by the node; and
process the batch of logs such that the processed batch of logs contains information in a form for making the information available to the event stream, wherein processing the batch of logs reduces redundant log entries and removes entries containing information used to validate at least one of liveness or health of the one or more data replication groups.

15. The non-transitory computer-readable storage medium of claim 14, wherein the instructions further comprise instructions that, when executed by the one or more processors, cause the computer system to:
generate one or more events based at least in part in the processed batch of logs; and
make available the generated one or more events to the event stream.

16. The non-transitory computer-readable storage medium of claim 15, wherein the instructions further include instructions that cause the computer system to cause a client to delete data associated with other data indicated as deleted by the generated one or more events.

17. The non-transitory computer-readable storage medium of claim 14, wherein the instructions that cause the computer system to obtain the batch of logs from memory of the node further include instructions that cause the computer system to obtain the batch of logs from a ring buffer memory of the node.

18. The non-transitory computer-readable storage medium of claim 14, wherein the instructions that cause the computer system to process the batch of logs further include instructions that cause the computer system to process the batch of logs such that a plurality of processed logs of the batch of logs contains information for making available to the event stream.

19. The non-transitory computer-readable storage medium of claim 14, wherein the instructions that cause the computer system to process the batch of logs further include instructions that cause the computer system to maintain, in the processed batch of logs, information corresponding to updates to data values stored in the one or more data replication groups as part of a key-value store.

20. The non-transitory computer-readable storage medium of claim 14, wherein the instructions that cause the computer system to process the batch of logs further include instructions that cause the computer system to remove duplicate entries in the processed batch of logs generated as a result of the one or more data replication groups comprising a plurality of nodes.

21. The non-transitory computer-readable storage medium of claim 14, wherein the instructions further comprise instructions that, when executed by the one or more processors, cause the computer system to maintain a cursor location indicating a most recent hatch of logs obtained.

* * * * *